(12) United States Patent
Prapavat (10) Patent No.: US 6,273,438 B1
(45) Date of Patent: Aug. 14, 2001

(54) HAND TRUCK (76) Inventor: Vuthisit Prapavat, 16808 Sunny Ridge Ct., Cerritos, CA (US) 90703

( * ) Notice: Subject to any disclaimer, the term of this patent is extended or adjusted under 35 U.S.C. 154(b) by 0 days.

(21) Appl. No.: 09/368,510

(22) Filed: Aug. 5, 1999

(51) Int. Cl.[7] ....................................................... B62B 3/02
(52) U.S. Cl. .................. 280/47.21; 280/47.2; 280/47.29; 280/641
(58) Field of Search ............................. 280/47.17, 47.18, 280/47.19, 47.2, 47.21, 47.24, 47.27, 47.28, 47.29, 639, 641, 47.35

(56) References Cited

U.S. PATENT DOCUMENTS

| Re. 28,936 | * | 8/1976 | Talamantez | 280/47.21 |
|---|---|---|---|---|
| 1,341,171 | * | 5/1920 | Hall | 280/47.21 |
| 3,063,730 | * | 11/1962 | Domoradzki | 280/47.21 |
| 3,655,212 | * | 4/1972 | Krass et al. | 280/47.28 |
| 4,762,333 | * | 8/1988 | Mortenson | 280/47.21 |
| 5,207,439 | * | 5/1993 | Mortenson | 280/47.2 |
| 5,779,251 | * | 7/1998 | Meier | 280/47.2 |

FOREIGN PATENT DOCUMENTS

| 703231 | * | 2/1965 | (CA) | 280/47.28 |
|---|---|---|---|---|
| 734075 | * | 10/1932 | (FR) | 280/47.21 |
| 49020 | * | 10/1938 | (FR) | 280/47.21 |

* cited by examiner

Primary Examiner—Frank Vanaman
(74) Attorney, Agent, or Firm—Milde, Hoffberg & Macklin, LLP (57) ABSTRACT

A hand truck which comprises the following essential elements:

(a) an elongate chassis having upper and lower ends and a first longitudinal axis between them;

(b) a handle arranged at the upper end of the chassis;

(c) load lifting platform arranged at the lower end of the chassis, the load lifting platform extending outward from the chassis along a second longitudinal axis which is substantially perpendicular to the first longitudinal axis;

(d) a pair of truck wheels disposed on opposite sides of the chassis adjacent the lower end, the truck wheels being rotatable about a common wheel axis which extends transversely to both the first and the second longitudinal axes; and (e) a wheel axle carriage supporting the truck wheels and being pivotable with respect to the chassis for moving the wheel axis between a first position on one side of the second longitudinal axis and a second position on the opposite side of the second longitudinal axis.

6 Claims, 8 Drawing Sheets

HAND TRUCK

BACKGROUND OF THE INVENTION

The present invention relates to a hand truck for carrying boxes, parcels, furniture and other heavy items.

A conventional hand truck comprises an elongate upright chassis having a handle at the upper end and having a load lifting platform (toe plate or fork) at the opposite, lower end. The platform extends outward from the bottom of the chassis at an angle of approximately 90°.

The chassis and platform are carried by a pair of rugged wheels, one on each side of the lower end of the chassis. The wheels are rotatable about individual axles on opposite sides of the chassis or about a single, common axle which extends across the width of the chassis. In either case, the wheels rotate about a common wheel axis which extends transversely to the longitudinal axis of the chassis.

A hand truck of this type is extremely useful, but it suffers from the drawback that it is inherently unstable. When carrying heavy loads (e.g., 200–700 pound loads) the hand truck has a tendency to either tip forward to its upright position, to where the load-bearing surface of the platform is horizontal, or tip backward to where the longitudinal axis of the chassis is essentially horizontal. With such heavy loads, a hand truck operator must be careful to maintain the hand truck in a balanced position with both the longitudinal axis of the chassis and the plane of the platform at an angle of about 45° with respect to the vertical (and horizontal).

SUMMARY OF THE INVENTION

A principal object of the present invention is to provide a hand truck having increased stability and safety as compared to hand trucks known heretofore.

This object, as well as other objects which will become apparent from the discussion that follows, are achieved, in accordance with the present invention, by providing a hand truck which comprises the following essential elements:

(a) an elongate chassis having upper and lower ends and a first longitudinal axis between them;

(b) a handle portion arranged at the upper end of the chassis;

(c) load lifting platform arranged at the lower end of the chassis, the load lifting platform extending outward from the chassis along a second longitudinal axis which is substantially perpendicular to the first longitudinal axis;

(d) a pair of truck wheels disposed on opposite sides of the chassis adjacent the lower end, the truck wheels being rotatable about a common wheel axis which extends transversely to both the first and the second longitudinal axes; and (e) a wheel axle carriage for supporting the wheels and for moving the wheel axis between a first position above the second longitudinal axis and a second position below the second longitudinal axis.

According to a particular feature of the present invention, the hand truck is also provided with a rear support structure, connected between the axle carriage and the chassis on the side of the longitudinal axis opposite to the platform, partially supporting the weight of the chassis and the load carried by the hand truck. When the chassis is tilted backward about its wheel axis, in a direction opposite to the direction of extension of the platform, the rear support structure contacts the ground and, together with the hand truck wheels, supports the weight of the chassis and its load.

Preferably, the rear support structure has at least one caster wheel arranged to make contact with the ground so that the hand truck, together with its load, can be moved about when in the load supporting position.

For a full understanding of the present invention, reference should now be made to the following detailed description of the preferred embodiments of the invention as illustrated in the accompanying drawings.

DETAILED DESCRIPTION OF THE PREFERRED EMBODIMENT

The preferred embodiment of the present invention will now be described with reference to FIGS. 1–12 of the drawings. Identical elements in the various figures are designated with the same reference numerals.

FIGS. 1–4 show the hand truck 10, in accordance with the invention, in various elevational views. The hand truck comprises an elongate chassis 12 having an upper end and a lower end. The chassis 12, which defines a first longitudinal axis 14, is formed of three parallel longitudinal struts 12a, 12b and 12c.

Figure 1:
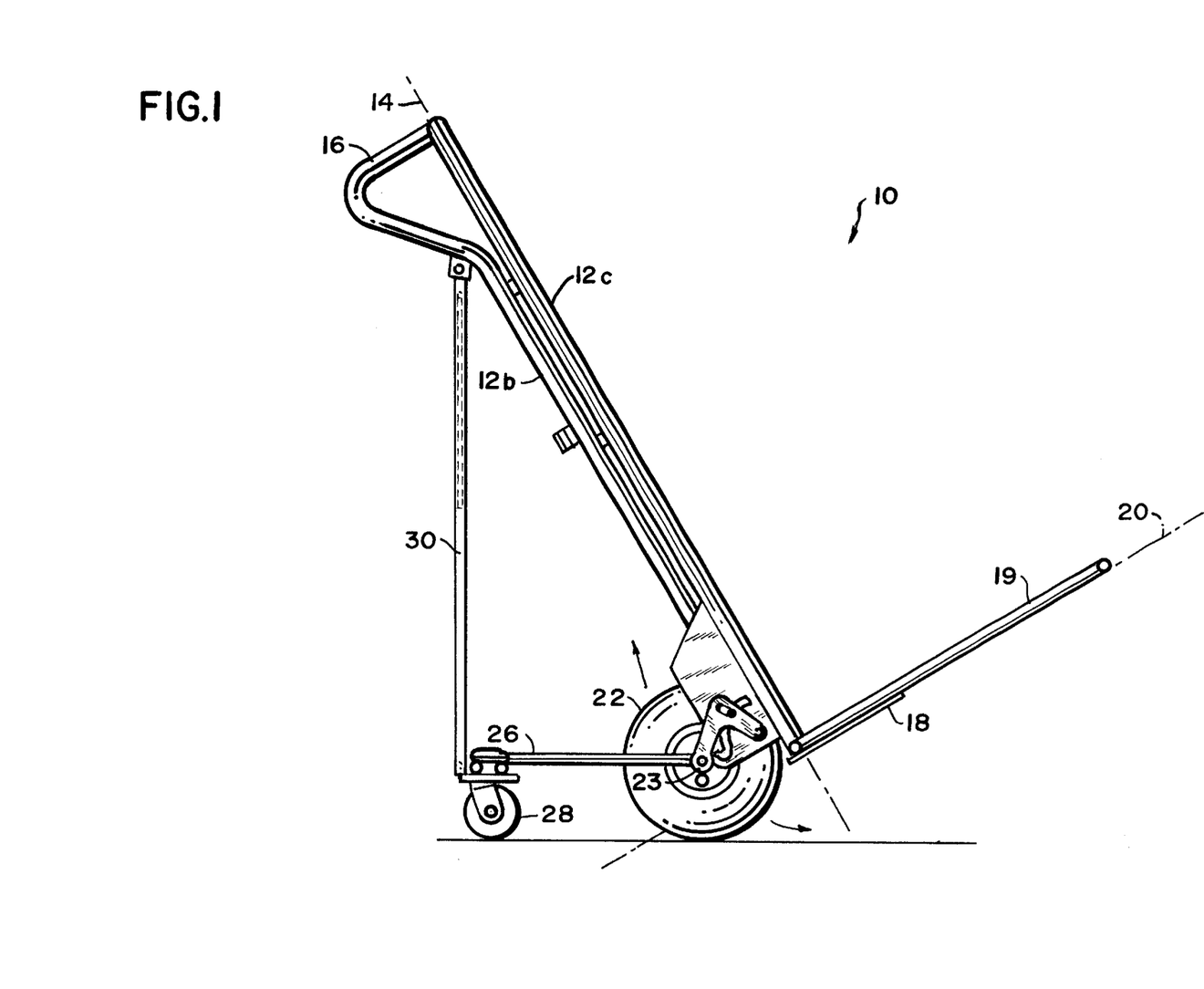
FIG. 1 is a side elevational view of a hand truck according to a preferred embodiment of the present invention.
Figure 2:
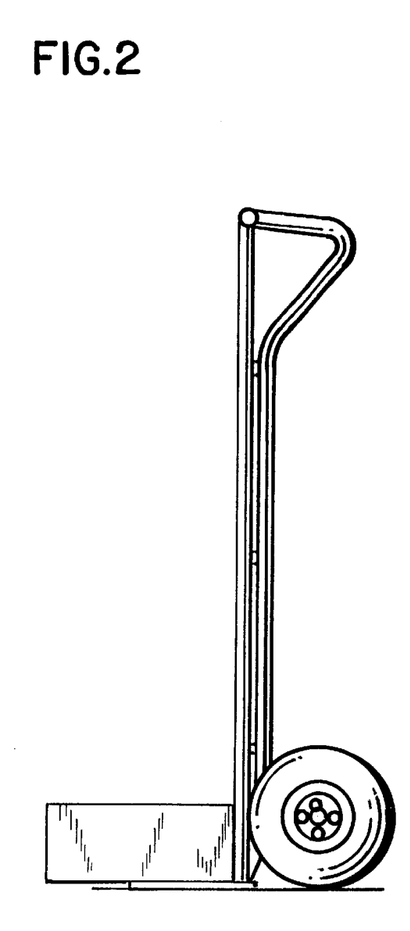
FIG. 2 is a side elevational view showing the hand truck of FIG. 1 in an upright position with its platform inserted beneath a load.

At the upper end of the chassis is arranged a handle 16 for the hand truck. This handle extends rearward, toward the position of the hand truck operator, and downward to where it is joined to the central strut 12b of the chassis 12. At the lower end of the chassis is a load lifting platform (toe plate 18) which extends outward from the chassis in a direction away from the hand truck operator. This plate 18 extends along a second longitudinal axis 20 which is perpendicular to the first longitudinal axis 14. The size of the platform may be enlarged by folding down a load-supporting rack 19 as shown in FIG. 1.

Near the lower end of the chassis, on the side opposite to the plate 18, a pair of hand truck wheels 22 are rotatably arranged on a common axle 23 which defines a third longitudinal axis 24. The third longitudinal axis 24 extends transversely to both the first longitudinal axis 14 and the second longitudinal axis 20.

In addition, the hand truck includes a rear support structure 26 which is rotatably mounted about the axle 23 and carries a pair of caster wheels 28. The support bracket 26 can be fixed at a plurality of angular positions about the axle 23 by telescoping member 30 that extends between the center extremity of the bracket 26 and the bottom of the handle 16.

Figure 4A:
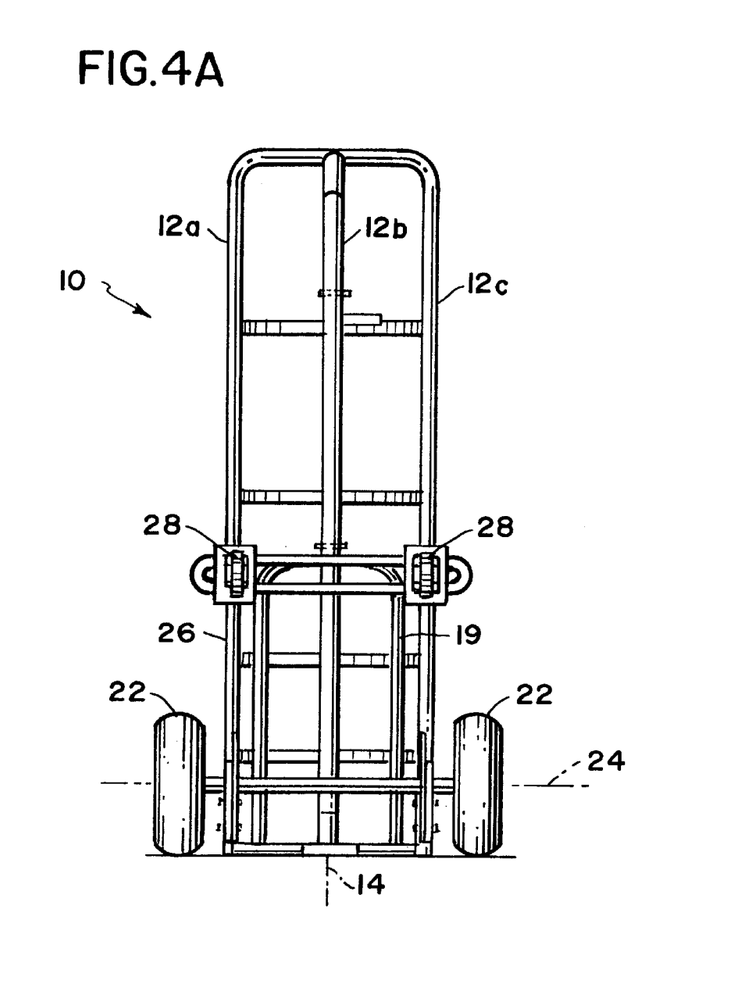
FIGS. 4A, 4B, 4C and 4D are rear, side, front and side elevational views, respectively, of the hand truck of FIG. 1.
Figure 4B:
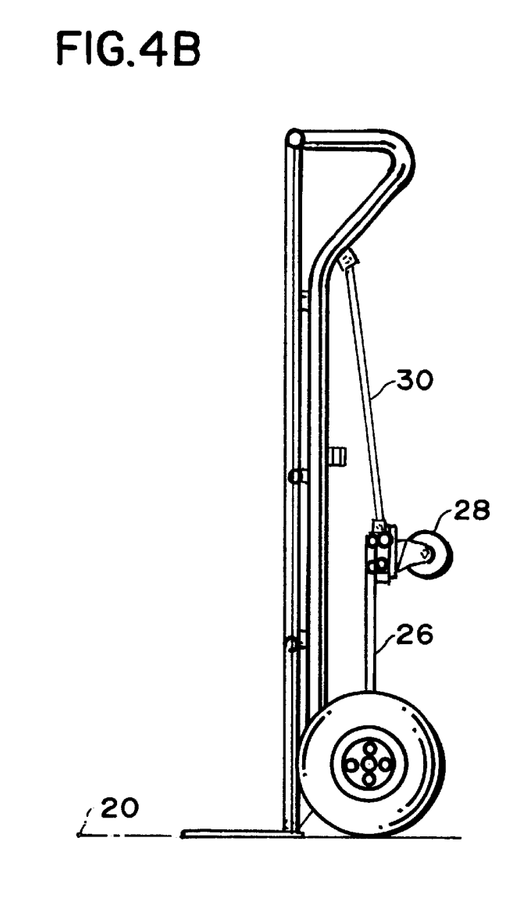
Figure 4C:
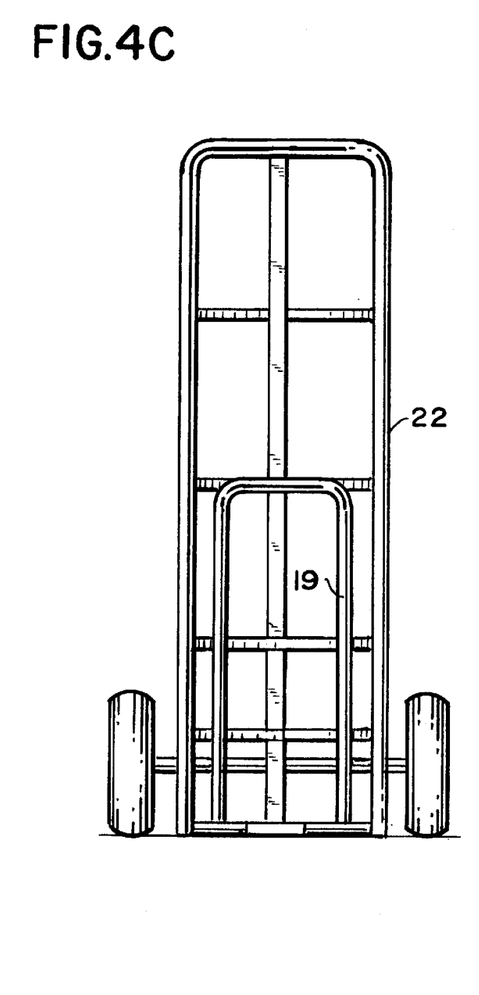
Figure 4D:
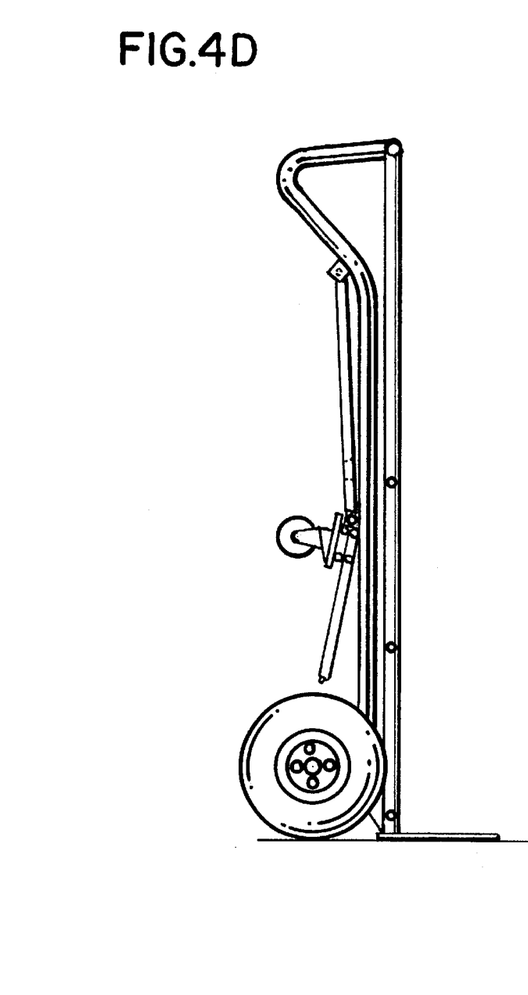

The telescoping member 30 is moveable between, two positions:

(1) a first position shown in FIG. 4D, wherein the caster wheels 28 are moved out of the way;

(2) a second position shown in FIG. 1, wherein the caster wheels 28 contact the ground and the longitudinal axis 14 of the chassis 12 is tilted backward. This position of the telescoping member 30 is used not only for the first axle position shown in FIG. 9, but also for the second axle position shown in FIG. 10. The bracket 26 can therefore be fixed at three different angular positions relative to the chassis 12.

Figure 5:
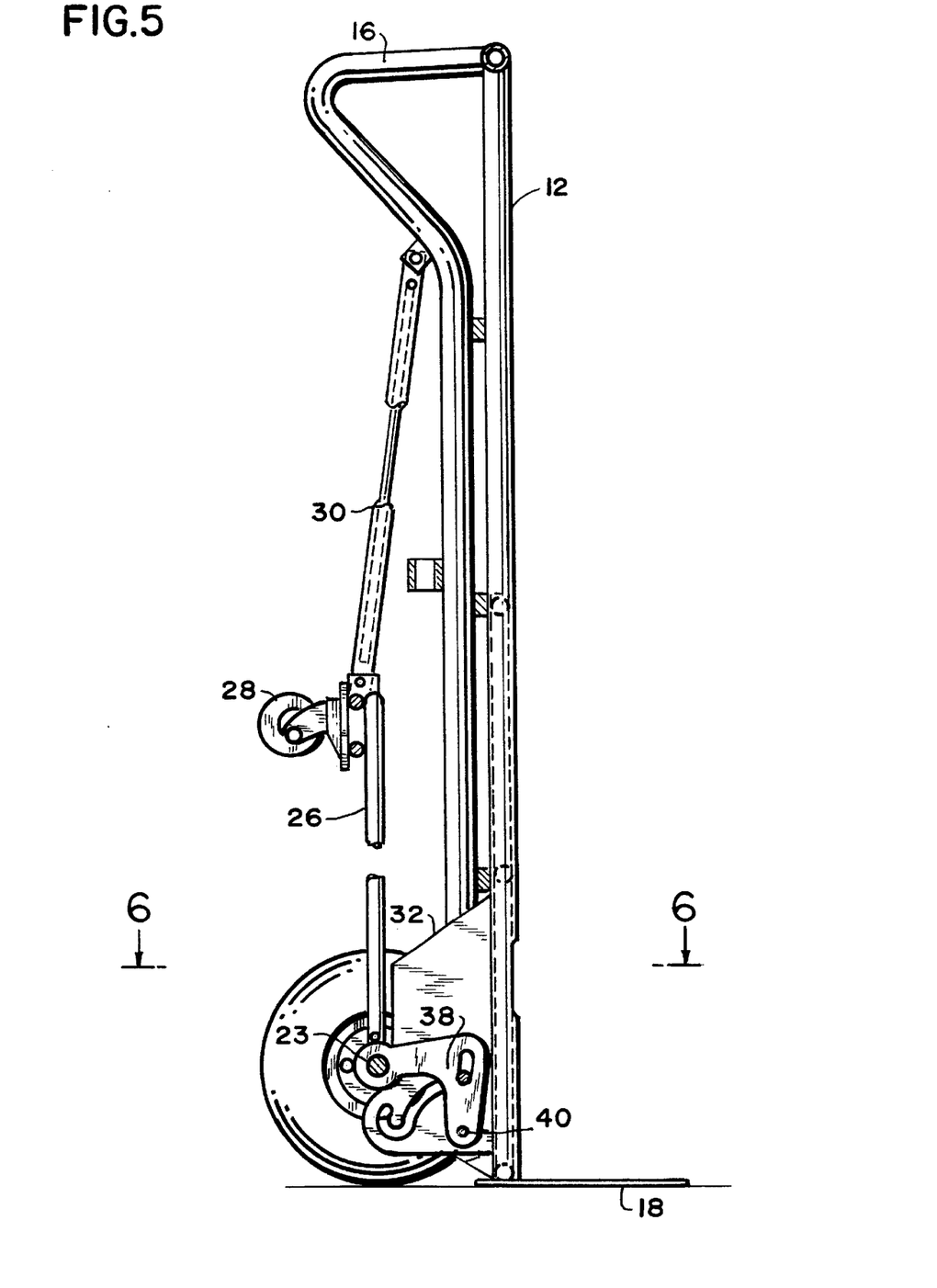
FIG. 5 is a detailed, partially cut-away view of the hand truck of FIG. 1, taken along the line V—V of FIG. 6.

FIGS. 5–8 show the hand truck in detail and provide dimensions of the various elements. Specific details of the rear support structure, circled in FIG. 5, are further illustrated in FIGS. 7 and 8.

Figure 6:
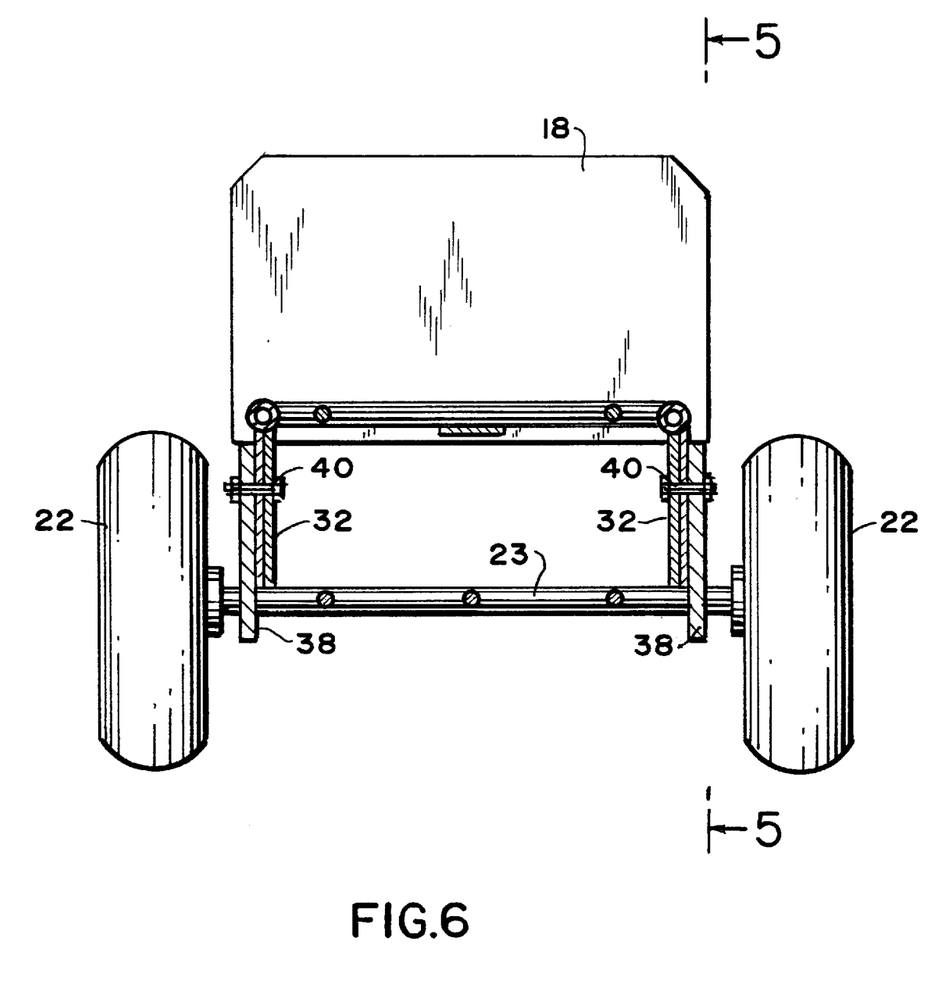
FIG. 6 is a detailed, cross-sectional view taken along the line VI—VI of FIG. 5.
Figure 7:
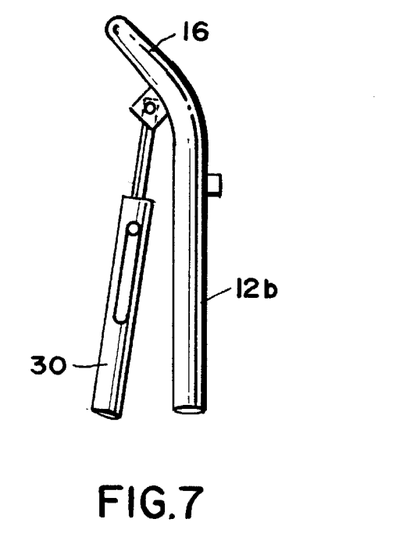
FIG. 7 and FIG. 8 are representational diagrams illustrating the upper and lower portions of the rear support structure respectively.
Figure 8:
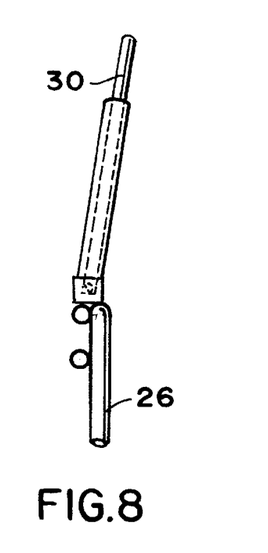

As may be seen in FIGS. 5 and 6, the hand truck wheels 22 are supported by a wheel axle carriage which comprises the axle 23 as well as members 38, each pivoted on one of the carrying plates 32 by means of a bolt 40.

Figures 9, 10:
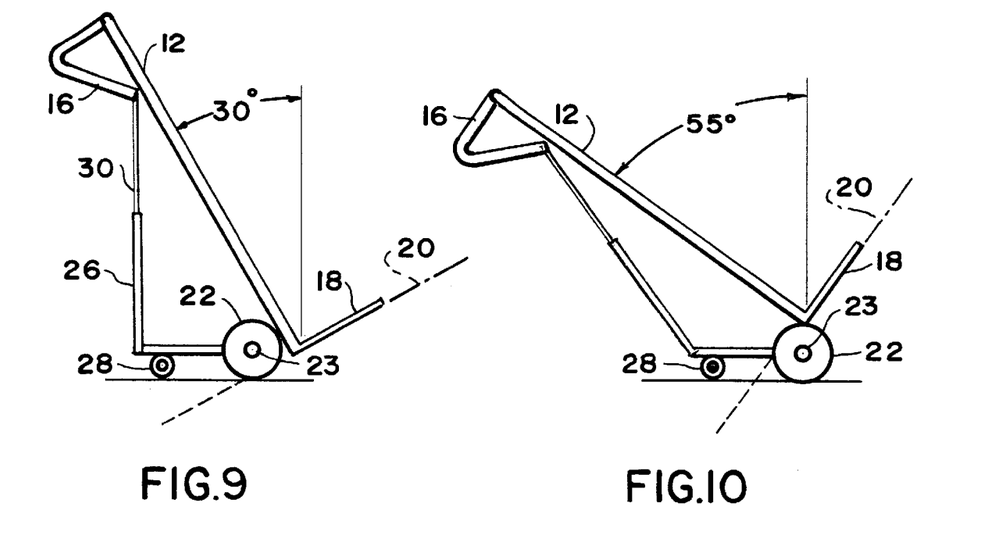
FIG. 9 and FIG. 10 are side elevational views showing the hand truck of FIG. 1 in a first load bearing position and a second load bearing position, respectively.

According to the invention, the axle carriage assembly for supporting the hand truck wheels 22 is operative to shift the wheel axis 24 from a first position on the upper side of the second longitudinal axis 20, as shown in FIG. 9, to a second position on the opposite side of the second longitudinal axis 20, as shown in FIG. 10. This shift of the wheel axis 24 from the first position to the second position moves the center of gravity of a loaded hand truck to a point behind the wheel axis 24 and prevents the hand truck from accidentally tilting forward.

Figure 11:
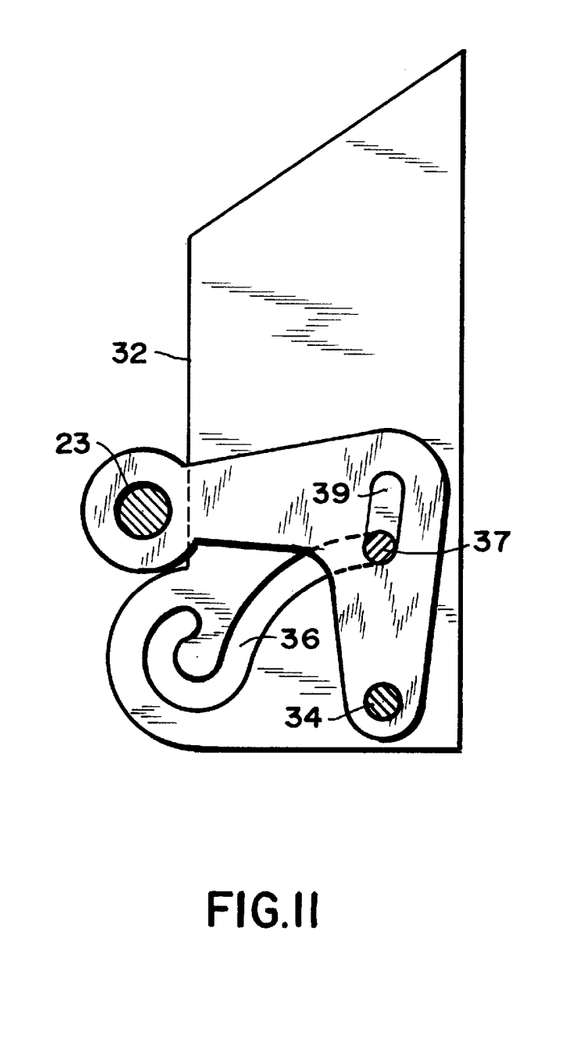
FIG. 11 show the wheel axle carriage assembly in the first position (FIG. 9)
Figure 12:
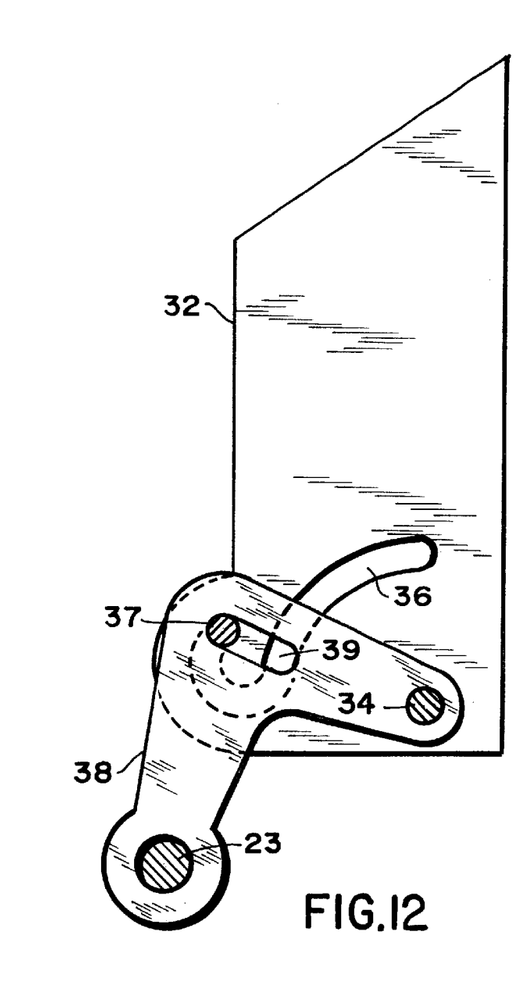
FIG. 12 shows the wheel axle carriage assembly in the second position (FIG. 10).

The mechanism for supporting the main wheels 22 of the hand truck and shifting the wheel axis between the two positions shown in FIGS. 9 and 10, is illustrated in detail in FIGS. 11 and 12. As shown in FIG. 11, a flat carrying plate 32 is welded to one of the longitudinal members 12a or 12c, of the chassis 12. Each plate 32 has a hole 34 and a hook shaped slot 36 a pivotable plate member 38 in the shape of a boomerang is pivotally mounted on the plate 32 at one of its ends, via a bolt 40 (FIGS. 5 and 6) which extends through the hole 34. Each plate member 38 supports the axle 23 at its opposite end.

FIGS. 11 and 12 illustrate the operation of the plate member 38 as it is moved from a first stable position, shown in FIG. 11, to the second stable position, shown in FIG. 12. As it is moved, a pin 37, which extends through the slot 36 in plate 32 as well as a slot 39 in the member 38, slides along the slot 36 to the hooked end.

Figure 3:
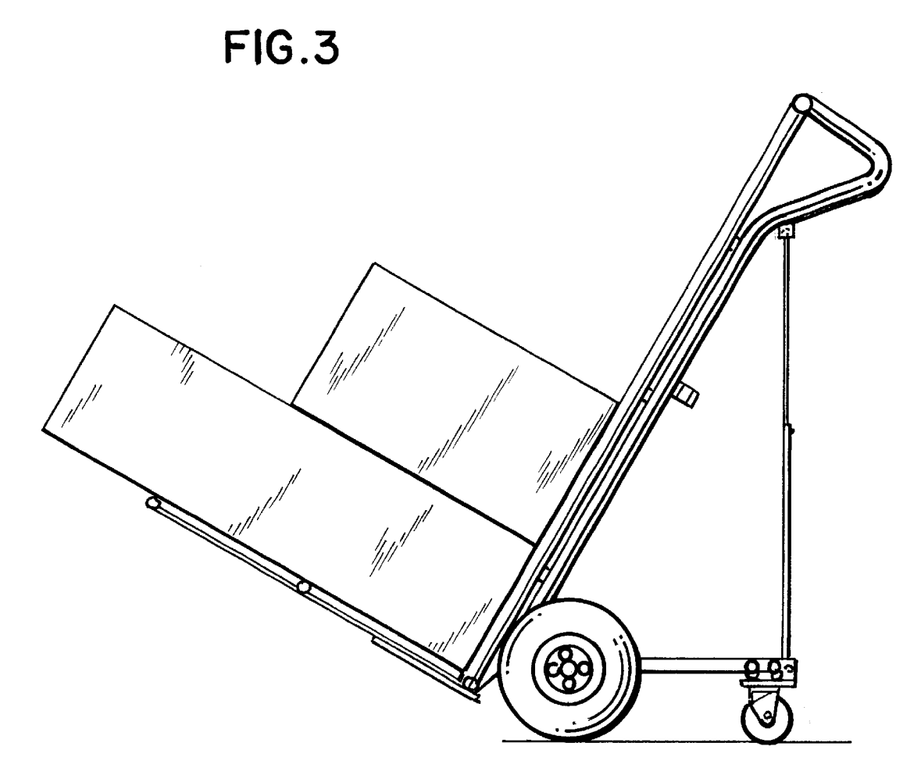
FIG. 3 is a side elevational view of the hand truck of FIG. 1 in a tilted position with its rear support structure extended outward to partially carry the weight of a load.

In operation, the hand truck operator normally utilizes the hand truck with the caster wheels 28 in the out-of-the-way position shown in FIGS. 4B and 4D. For heavier loads, the support structure 26 can be moved downward to the position shown in FIGS. 1, 3 and 9. In the case of a relatively large load, as shown in FIG. 3, the hand truck is somewhat unstable in this position which, as shown in FIG. 9, has the hand truck tilted backward by approximately 30 degrees.

To increase the stability of the hand truck, the operator moves the wheel axle 23 from the first position, shown in FIG. 9, to the second position, shown in FIG. 10, by pulling Backward and downward on the handle 16. The chassis 12 of the hand truck is thereby tilted backward so that the plate members 38 pivot about bolts 40 in holes 34, and the pins 37 move in slots 36 from the position of FIG. 11 to the position of FIG. 12, then into the hooked ends of the slot, where the axle is again stable. During this movement, the pins 37 also move from one end of the slots 39 to the other. The chassis is then approximately 55 degrees with respect to the vertical, thus substantially increasing the stability of the loaded hand truck.

There has thus been shown and described a novel hand truck which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claim or claims which follow.

What is claimed is:

1. A hand truck comprising, in combination:

(a) an elongate chassis having an upper end, a lower end, and a first longitudinal axis between said ends;

(b) a handle portion arranged at said upper end of the chassis;

(c) load lifting platform arranged at said lower end of the chassis, said load lifting platform extending outward from said chassis along a second longitudinal axis which is substantially perpendicular to said first longitudinal axis;

(d) a pair of truck wheels disposed on opposite sides of the chassis adjacent said lower end, said truck wheels being rotatable about a common wheel axis which extends transversely to both said first and said second longitudinal axes; and (e) a wheel axle carriage supporting said truck wheels, said carriage being pivotable with respect to said chassis. in response to backward and downward movement of the handle, for moving said wheel axis between a first position above said second longitudinal axis and a second position below said second longitudinal axis.

2. The hand truck according to claim 1, further comprising a rear support structure, connected between said axle carriage and said chassis, for partially supporting the weight of the chassis and the load carried by the hand truck, when said chassis is tilted backward about said wheel axis.

3. The hand truck according to claim 2, wherein said rear support structure includes at least one caster wheel arranged to contact the ground when said chassis is tilted backward.

4. The hand truck of claim 3, wherein the support structure comprises an elongate bracket which carries said at least one caster wheel, said bracket being pivotable at one end about said wheel axis, and a telescoping member extending between the upper end of said chassis and said bracket, said telescoping member being moveable between a first position, wherein the, elongate bracket is adjacent and substantially parallel to the elongate chassis, and a second position, wherein the caster wheel contacts the ground when the chassis is tilted backward.

5. The hand truck of claim 1, further comprising a pair of carrying plates fixed to the chassis, said wheel axle carriage comprising a pair of pivotable plates each of which is pivotally mounted adjacent, in plane parallel relationship to a respective one of said carrying plates.

6. The hand truck of claim 5, wherein each said carrying plate has a hook-shaped slot with an upper end and a hooked end, and each said pivotable plate has a substantially linear slot therein, said truck further comprising a pin extending through each adjacent pair of slots comprising the hooked-shaped slot of a carrying plate and the linear slot of the adjacent pivotally mounted pivotable plate, each said pin sliding from the upper end to the hooked end of the hook-shaped slot, and from one end to the other of the linear slot, as the pivotable plates pivot with respect to said carrying plates, whereby said wheel axis moves from said first position to said second position.

* * * * *